United States Patent

[11] 3,603,887

[72] Inventors James D. Doss;
Donald C. Hagerman, both of Los Alamos, N. Mex.
[21] Appl. No. 10,969
[22] Filed Feb. 12, 1970
[45] Patented Sept. 7, 1971
[73] Assignee The United States of America as represented by the United States Atomic Energy Commission

[54] HIGH VOLTAGE REGENERATIVE PULSE MODULATOR
5 Claims, 11 Drawing Figs.

[52] U.S. Cl. .......... 328/59, 328/64, 328/209, 328/232, 332/7, 332/13
[50] Field of Search .......... 328/232, 59, 64, 66, 68, 209; 332/13, 7, 25, 58

[56] References Cited

UNITED STATES PATENTS 3,339,146 8/1967 Gorski .......... 332/13
3,414,825 12/1968 Gorski .......... 328/232

*Primary Examiner*—Donald D. Forrer
*Assistant Examiner*—David M. Carter
*Attorney*—Roland A. Anderson

ABSTRACT: Apparatus for generating a rectangular wave positive pulse having an amplitude of 80 kilovolts or more in response to low voltage timing signal pulses in which a thermionic tube has its cathode connected to one terminal of one winding of a feedback transformer and the other terminal is connected to negative high voltage through a load resistor, and the other winding of the transformer is connected in series with the secondary winding of a high voltage input transformer and the series circuit so constructed is connected to the thermionic tube cathode and grid. The primary of the input transformer is connected to the output of a low power amplifier which in turn has its input coupled to a timing signal pulse source having an amplitude of the order of 10 volts.

REGENERATIVE MODULATOR CONFIGURATION

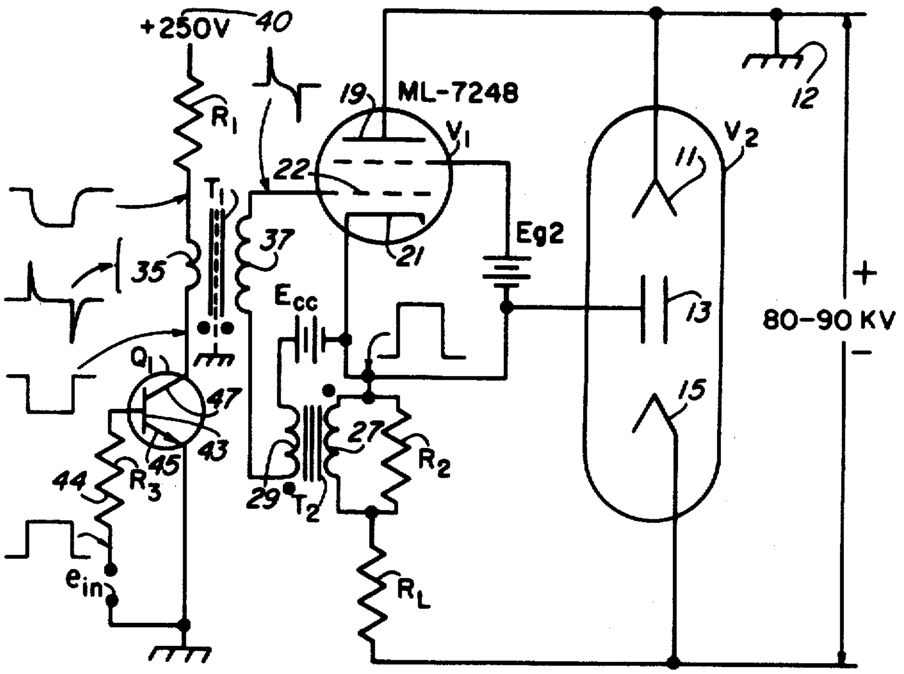
Fig 1 REGENERATIVE MODULATOR CONFIGURATION
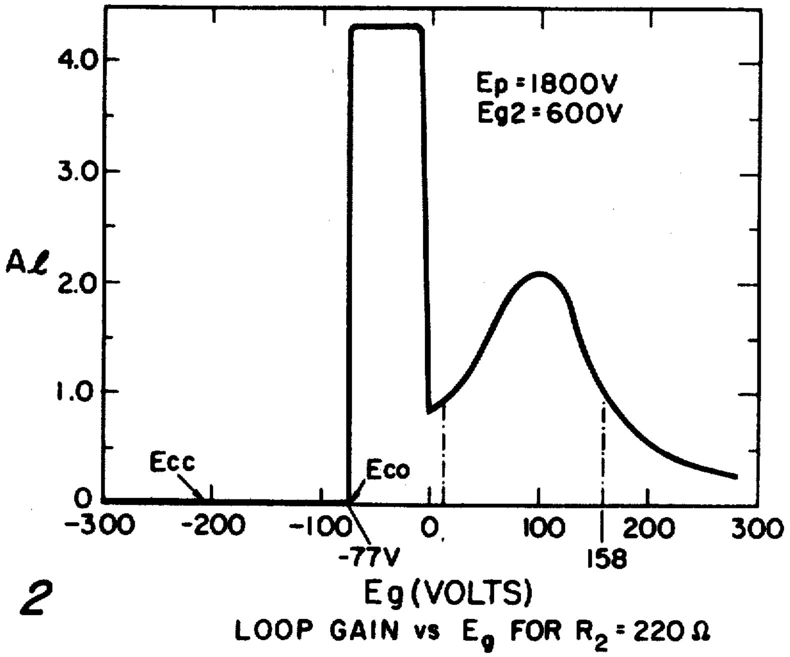
Fig 2 LOOP GAIN vs $E_g$ FOR $R_2$ = 220 Ω
INVENTOR.
James D. Doss
Donald C. Hagerman
BY
Roland A. Anderson
Attorney

PATENTED SEP 7 1971 3,603,887

SHEET 2 OF 5

INVENTOR.
James D. Doss
Donald C. Hagerman
BY
Roland A. Anderson
Attorney

OPERATING POINT DETERMINATION, $R_2$=220Ω

TRIAL AND ERROR LOAD-LINES

INVENTOR.
James D. Doss
Donald C. Hagerman
BY
Roland A. Anderson
Attorney

LOOP GAIN vs Eg FOR $R_2$=119Ω

LOAD-LINE
DETERMINATION OF Eg= f (Ip), $R_2$= 119 Ω

INVENTOR.
James D. Doss
Donald C. Hagerman
BY
Roland A. Anderson
attorney

OPERATING POINT DETERMINATION, $R_2$ = 119 Ω

INVENTOR.
James D. Doss
Donald C. Hagerman
BY
Roland A. Anderson
Attorney

HIGH VOLTAGE REGENERATIVE PULSE MODULATOR

The invention described herein was made in the course of, or under, a contract with the U.S. ATOMIC ENERGY COMMISSION In the pulsed radio frequency art, the final radio frequency amplifier is activated from a quiescent state to a full output power state for the duration of each pulse by a modulator tube frequently termed a pulse or switch tube. In high power applications the modulator tube and its circuitry is subject to stringent requirements. Many of these requirements are well known in the radar art and are discussed in Volume 5, *Pulse Generators of the Radiation Laboratory Series*, published by McGraw-Hill Book Company in 1948. The more recent advent of linear accelerators for accelerating and propelling charged particles along a waveguide has generated exceedingly severe demands on such apparatus. For example, the linear accelerator being constructed at Los Alamos, N.M., for meson generation utilizes 44 1-megawatt peak power klystrons, triggered by 44 hard tube modulators. Both the klystrons and modulator tubes are activated only during "on" pulse periods in order to obtain peak powers far in excess of the tubes' continuous duty capabilities and to avoid the waste of intolerable amounts of electrical power.

The aforementioned Los Alamos accelerator, better known as the Los Alamos Meson Physics Facility (LAMPF), is designed to operate at a maximum beam duty factor of 12 percent. That is, the proton injector will operate at 12 percent duty factor. This amounts to a pulse width for the injector of 1 millisecond at a pulse repetition rate of 120 Hz. The RF amplifiers, i.e., the klystrons with associated circuitry, must operate at a somewhat longer pulse width because the resonant accelerator structure load has a very high Q. The amplifiers must supply RF power to the resonant tanks during "-fill" time until the tank electric gradients reach the proper value as well as during the duty period. This fill time is a function of bandwidth, and where the operating frequency is 805 MHz and the tank Q is 20,000, the fill time is $$t_f = \frac{2.2}{\pi\left(\frac{f_0}{Q}\right)} = 17.4 \text{ microseconds} \qquad (1)$$

where $t_f$ is the fill time and $f_0$ is the resonant frequency of the tank.

Taking the fill time into consideration, the amplifiers must work a duty cycle slightly greater than 12 percent. The actual RF envelope pulse width depends upon the peak output capability of each individual amplifier among other parameters since each amplifier is servo controlled to lock itself at the proper output power levels. The RF drive to each klystron will be controlled to accomplish this. The RF drive to each klystron is started only after its modulating anode voltage has reduced a value within 10 percent of the voltage on the klystron collector and therefore the duration of the modulating anode voltage is even longer. Since the rise time of the modulating anode voltage with the circuitry of the present invention is found to range from 50 to 80 microseconds, the maximum modulating pulse width can be assumed to be 1.1 milliseconds. Pulse width is required to be variable over a wide range on a pulse to pulse basis, however. This and the long maximum pulse length eliminate the possibility of using pulse forming networks to determine pulse width such as is shown for example in FIG. 4.3 on page 125 of the referenced Volume 5 of the *Radiation Laboratory Series*.

Another common method of pulse modulator drive in the prior art is the delivery to the grid of the modulator tube of a square wave from an associated trigger pulse source. This technique requires an expensive close-coupled, high voltage insulated, input transformer and where 44 of such stages are involved it is highly desirable to avoid such cost.

In order to facilitate understanding of the present invention the characteristics of the radio frequency apparatus and preferred operation thereof is briefly explained. The radio frequency energy injected into the linear accelerator waveguide is provided by klystron amplifiers having the following characteristics.

| | |
|---|---|
| Type of amplifier | five-cavity klystron |
| Frequency of operation | 805 megahertz |

Typical Operating Characteristics

| | |
|---|---|
| Collector to Cathode Potential | 85 kv. |
| Collector Current | 40 a. |
| Modulating Anode Voltage | 80 kv. peak |
| Modulating Anode Current | 0.01 a. peak |
| RF Gain | 50 db. |
| RF Envelope Duration | 1 millisecond |

Each klystron is associated with a modulator which supplies the modulating anode voltage. The modulator utilizes a heavy-duty hard tube of tetrode configuration. One tube-type selected for use in the LAMPF prototype modulators is the type ML-7248 made by Machlett Laboratories, Inc. of Springdale, Conn. Other makes of tubes having similar characteristics may be used. Typical operating conditions for the ML-7248 as a high voltage switch tube submerged in cooling oil are:

| | |
|---|---|
| DC Plate Voltage | 125 kv. |
| DC Screen Grid Voltage | 600 Volts |
| DC Control Grid Voltage | −360 Volts |
| Pulse Positive Control Grid Voltage | 250 Volts |
| Pulse Plate Current | 1.02 Amperes |
| Pulse Screen Grid Current | 0.27 Amperes |
| Pulse Control Grid Current | 0.22 Amperes |
| Tube Drop | 1200 Volts |
| Plate Dissipation in Oil with Radiator | 250 Watts |
| Duty Maximum for this condition of Operation | 12% |

From the operating characteristics of the tube it is seen that with a cathode-anode interelectrode current of approximately 1 ampere, the required klystron modulating anode potential of 80 kv. requires an 80 kilohm load resistor in the output of the modulator tube circuit. As stated above, the modulator pulse is usable only at or very close to the 80 kv. value. The energy consumed during rise time is wasted so fast rise time is desirable. However, rise time decrease is a function of decreasing load resistance whereas modulator tube life is adversely affected by decreasing load resistance. Additionally, the wasted energy consumed in the klystron collector during modulator pulse rise and fall time is considerable. In fact, the energy wasted in the collector is a function of the value of the modulator load resistor to the five/halves power and with a 80 kilohm load resistor the energy wasted in one circuit in a typical years operation is approximately 180,000 kw./hr Considering that there are 44 such circuits, any solution which reduces rise and fall time of the modulator pulse without shortening tube life to less than an acceptable duration results in worthwhile economies.

The above recitation of conditions and problems in the modulator or switch tube circuitry lays the basis for an understanding of the advantages pertaining to the method and apparatus of this invention.

It is a primary objective of the present invention to provide a high power modulator pulser which avoids the need for an expensive close-coupled high-voltage input transformer.

Another objective is to provide modulator circuitry which requires only small positive rectangular pulses of selected duration of magnitude of about 10 volts to switch on and off the modulator tube.

Yet another objective of the present invention is to provide a pulse tube modulator of the regenerative-type which avoids a high-voltage interface in the feedback circuit.

Still another object is to provide a simplified rectangular wave pulser which is regenerative and capable of long duration high-voltage pulses whose width is controllable on a pulse to pulse basis.

These and other objects and advantages of the invention are realized by placing the feedback transformer in the cathode load resistor thereby avoiding a high-voltage interface between the primary and secondary windings of the feedback transformer, and utilizing a simple input transformer which is able to withstand 90 kilovolts but which need only be capable of transferring short positive and negative going pulses to the modulator tube grid. The critical feedback factor for stable operation is obtained by proper adjustment in the value of a load resistor in shunt with the primary of the feedback transformer.

The invention will be described in greater detail by reference to the drawings in which:

FIG. 1 is a schematic and diagrammatic showing of the circuit of the present invention;

FIG. 2 is a graph of loop gain us grid voltage for the modulator circuit;

Figure 6:
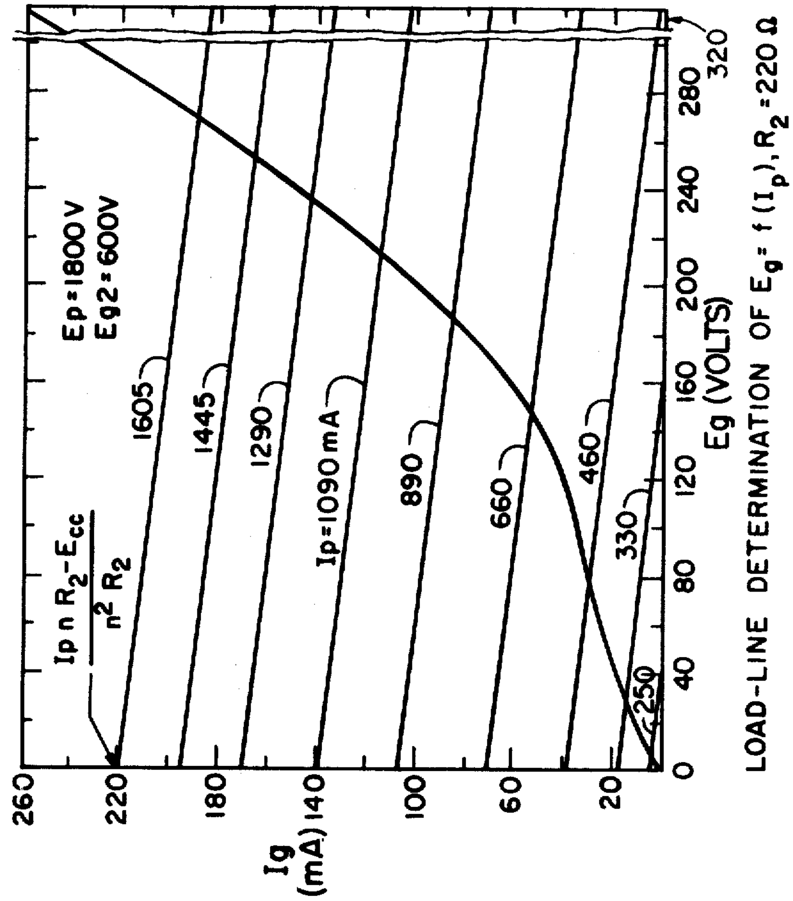
FIG. 6 is a graph showing a load line determination of $E_g = f(I_p)$ for one condition of operation.

Referring now to FIG. 1, the modulator tube is indicated by $V_1$ and the klystron by $V_2$. Tube $V_1$ is a high-power hard modulator tube. The klystron collector 11, because of the nature of construction of such tubes, is grounded at 12. The modulating anode 13 of klystron $V_2$ during quiescence is at cathode potential (−80 to −90 kv.) but during duty time it must be close to collector potential. A positive-going 80 kilovolt pulse of essentially constant amplitude for the pulse duration is therefore demanded from the $V_1$ cathode.

Regeneration is provided by transformer $T_2$. The primary 27 is connected between load resistor $R_L$ and cathode 21. Transformer $T_2$ is a commercial quality audio output transformer. Secondary winding 29 of transformer $T_2$ is connected between the control grid 22 and the cathode 21 with the necessary bias potential source $E_{cc}$ and the secondary of a pulse input transformer $T_1$ inserted in series. The input pulse transformer is designed to have a very low-time constant $L_1/R_1$ compared to the desired modulator output pulse duration. To this end, the leakage inductance of $T_1$ is small compared to the open-circuit inductance. In the present circuit, the need for a high-fidelity high-voltage input transformer for conveying the amplified rectangular input pulse to the grid of the modulator tube is avoided. The circuit provided in accordance with this invention translates the rectangular input signal into a positive going and a negative going spike (differentiated) pulse, corresponding to the leading and trailing edges of the input rectangular pulse, at the grid of the modulator tube. Provided that the leakage inductance of transformer $T_1$ be small compared to the open circuit inductance to provide the aforementioned low time constant and that the transformer primary and secondary be insulated from each other to provide a voltage interface exceeding 90 kilovolts, the design is not critical. One practical embodiment of transformer 7 utilizes a 1-½ square inch cross section core 34, 100 turns in primary 35 and 300 turns in secondary 37. The primary is wound adjacent the core and the secondary is enclosed in an insulating torus surrounding the core but spaced therefrom to provide adequate voltage isolation. $T_1$ may even be constructed with an air core since only a minute energy need be transferred.

A saturable amplifier utilizing transistor $Q_1$ is provided. Input terminals $e_{in}$ are connected in series with base resistor 44 to impress the rectangular input signal pulse across base 43 and emitter 45. Collector 47 is connected in series with primary 35 of transformer $T_1$ and a current limiting resistor $R_1$. Secondary 37 of transformer $T_1$ is connected to the modulator tube control grid and in series with the secondary 29 of transformer $T_2$ and bias source $E_{cc}$ to the cathode 21 of modulator tube $V_1$.

The operating parameters of the input circuitry provides a turn on positive pulse and a turnoff negative pulse to the grid of $V_1$ in response to input rectangular signal pulses. The leading edge of the input signal, due to the low-time constant of transformer $T_1$, promptly drives the transistor to saturation. At the leading edge the time rate of change of primary current in $T_1$ generates a positive spike in the secondary. As soon as saturation is reached the collector current is limited and remains constant for the duration of the input signal pulse. When the input signal pulse terminates, the transistor becomes biased to a low operating point, or to cutoff, resulting in a rapid collapse of magnetic flux in transformer $T_1$ resulting in a negative output pulse spike from secondary 37 The parameters in the input circuit are chosen so as to translate input signal pulses of magnitude of about 10 volts into secondary voltage spike of magnitude sufficient to drive modulator tube $V_1$ into conduction from a cutoff state. In the practicable embodiment shown, 300 volt spikes were utilized.

The positive spike on the control grid of $V_1$ drives the tube into conduction and if the incremental loop gain is greater than one, modulator tube $V_1$ drives itself into a higher conducting ting state independent of any further input derived from the input signal pulse. The parameters of the modulator tube circuit are chosen as will become apparent as this description proceeds, so that the circuit will settle into a stable operating conducting condition. The conducting condition is maintainable for a duration longer than required by the duration of the input signal pulse so that it is terminated by the negative spike derived from the input signal circuitry. It is essential, at the operating stable conducting condition of the modulator tube, that the feedback gain be less than one, but also that during rise and fall times of the output pulses from $V_1$, feedback be greater than one. The negative spike from the secondary of $T_1$ in response to the trailing edge of the input signal pulse moves the operating condition into an area where loop gain is again greater than unity, so that regenerative action rapidly moves $V_1$ into the cutoff condition and the modulator output pulse is terminated.

The circuit configuration above described provides for an inexpensive, compact input transformer at the high-voltage interface and provides for a relatively inexpensive feedback transformer $T_2$ because even though its open circuit inductance must be large, it is so placed that it does not have to withstand high voltage between its windings.

In order to select the proper parameters for stable operation, the loop gain and dynamic behavior of the modulator tube grid circuit and transconductance is analyzed.

The small signal loop gain or feedback factor in the modulator circuit is a function of tube transconductance, feedback transformer characteristics, the value of the feedback loading resistance $R_2$ and effective control grid loading.

The gain equation has the form:

$$A_1 = G_m r_1 n$$

where $G_m$=transconduction of the modulator tube, $$r_1 = R_2 // (r_g / n^2)$$

$$r_g = \left.\frac{\partial E_g}{\partial I_g}\right]_{E_{p2} E_{g2} = \text{constant}}$$

wherein $E_g$ = voltage from control grid to cathode $I_g$ = control grid current $E_{g2}$=screen grid voltage
$n$ = turns ratio of $T_2$
$||$ = in parallel with
$r_g$ = dynamic grid resistance Loop gain is far from being constant even over a small range of operating points. Transconductance $G_m$ will vary considerably from cutoff to saturation and $r_l$ varies drastically due to the variation in grid loading. For positive grid voltages $r_g$ must be measured at several points with small changes in $E_g$ and $I_g$ being used.

For negative grid voltages $r_g$ is infinite and $r_l$ is simply equal to $R_2$ for all practical purposes, so that the loop gain is:

$$A_l = G_m R_2 n \text{ for } E_g < 0$$

Since $G_m$ is practically constant between the operating points where grid voltage varies from cutoff to zero bias, loop gain is also almost constant. The relationship of loop gain to grid voltage is shown in FIG. 2. The screen grid voltage is adjusted to positive 600 volts. It is seen that there are three conditions of operation where loop gain is less than unity. The first is a simple case, which is everywhere that grid voltage is more negative than the cutoff value of −77 v. The second case is where grid voltage is in the range of from approximately zero volts to +8 v. The third case is where positive grid voltage exceeds plus 158 volts. It will be recalled that once the modulator tube is driven to conduction in the neighborhood of 1 ampere, it is desired that it hold that state for the duration of the desired output pulse. The operating condition of loop gain, less than one where operation is stable, is the condition of grid voltage exceeding plus 158 volts. It is necessary to determine where in the plus 150 volt range the operating point should be selected. This investigation necessitates determining the behavior of the feedback circuitry.

The equation relating grid voltage to anode current and time is developed with the effects of leakage inductance and internal capacitances of $T_2$ being ignored as inconsequential.

It is desired to generate a relationship of the form:

$$E_g = f(I_p, t)$$

where $I_p$ is the modulator tetrode tube anode current that will flow through the parallel combination of $R_2$ and primary 27 of $T_2$, and $t$ is time. As will be seen, the value of $R_2$ is a key parameter in the analysis and design of the circuit. To determine the initial effect, time is allowed to go to zero, giving:

$$E_g = f(I_p) \quad (2)$$

Once the effect of anode current upon $E_g$ is known, this equation is solved simultaneously with the familiar:

$$I_p = f(E_g) \quad (3)$$

The simultaneous solution of the $E_g$ and $I_p$ equations will be made by graphical means and will reveal the initial operating point. This initial operating point will change very little during the 1 millisecond pulse.

The derivation of the equation relating grid voltage to anode current and time follows below.

Definition of Symbols:
$L$ = Open-Circuit Inductance of $T_2$ secondary 29
$R_g = E_g/I_g$
$R_2$ = Resistance of $R_2$ across primary 27 of $T_2$
$R'_2 = n^2 R_2$
$n$ = turns ratio of transformer $T_2$
$R = R_g // R'_2$
$I$ = Constant current flowing through primary 27 of $T_2$ and $R_2$
$I' = I/n$
$i_1$ and $i_2$ are defined in FIG. 4.

Figure 3:
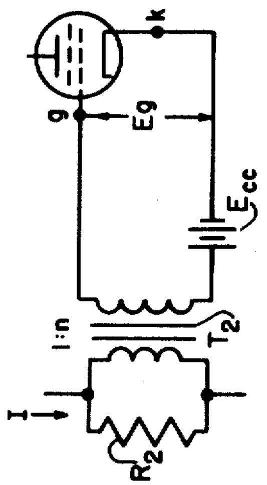
FIGS. 3, 4 and 5 are schematic equivalent grid circuits of the modulator tube circuit of the present invention useful in operational analysis.
Figure 4:
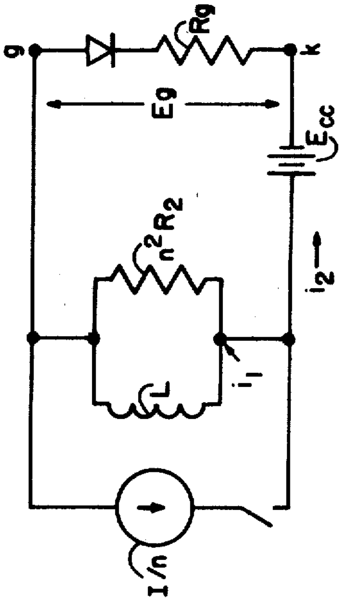
Figure 5:
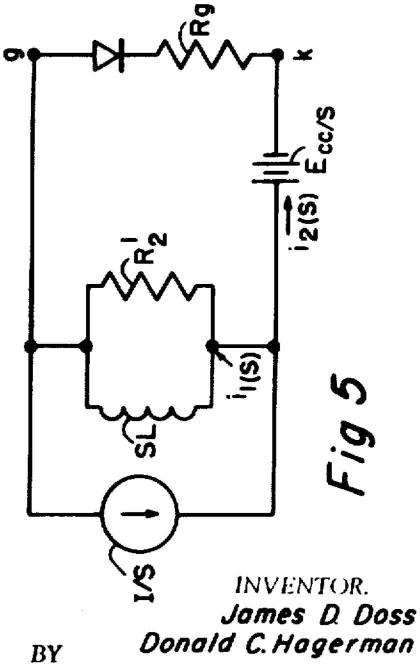

The equivalent circuits of FIGS. 3, 4 and 5 are based on the fact that the leakage inductance of transformer $T_2$ is small compared to its open circuit inductance, and that core saturation of $T_2$ does not occur during modulator operation.

FIG. 3 indicates the actual circuit configuration with the exception of the input signal pulse transformer $T_1$. This portion of the circuit is omitted since the $T_1$ transformer time-constant $L_1/R_1$ is very small compared to the time constants associated with the inductance of transformer $T_2$. FIG. 4 is the equivalent grid circuit. FIG. 5 shows the equivalent grid circuit with the parameters given in $s$-plane notation:

Important relationships are:

$$(I'/s) = i_1(s) + i_2(s)$$

and $$\frac{-E_{cc}}{s} = i_2(s) Rg = i_1(s) \left(\frac{R'_2 Ls}{R'_2 + Ls}\right)$$

$i_2(s)$ is now determinable from these two equations. When simplified, the result is $$i_2(s) = \left(\frac{I'R'_2}{Rg + R'_2}\right)\left(\frac{1}{s + R/L}\right) - \left(\frac{E_{cc}}{Rg + R'_2}\right)\left(\frac{1}{s + R/L} + \frac{R'_2 L}{s(s + R/L)}\right)$$

Taking the inverse transform and simplifying:

$$i_2(t) = I'\left(\frac{R'_2}{Rg + R'_2}\right)E^{-\frac{Rt}{L}} - \frac{E_{cc}}{Rg}\left(1 - \left[\frac{R'_2}{R'_2 + Rg}\right]E^{-\frac{Rt}{L}}\right)$$

Now, $E_g$ may be found as a function of $I'$:

$$E_g = i_2 R_g = I'(R'_2 // R_g)E^{-\frac{Rt}{L}} - E_{cc}\left(1 - \frac{R'_2}{R'_2 + R_g}E^{-\frac{Rt}{L}}\right) \quad (4)$$

It will be noted that as $t$ approaches infinity, $E_g$ approaches $E_{cc}$. This is the correct result and is one check on the accuracy of the expression. A more useful result, however, is the limiting value of $E_g$ at $t$ approaches zero. At $t=0$ $$E_g = \frac{I}{n}\left(n^2 R_2 // R_g - \left(E_{cc}\frac{R_g}{n^2 R_2 + R_g}\right)\right) \quad (5)$$

This is a logical result since it matches the initial conditions of the circuit that one would expect to obtain. It is also a useful result, since it may be used to find the initial operating point of the circuit.

Even with the equation that formulates the effect of the anode plate current upon $E_g$, it is still not possible to find the simultaneous solution of this equation and the $I_p = f(E_g)$ relation. This is because $R_g$ in equation (5) is not at all constant as $E_g$ varies. Like its incremental counterpart, $r_g$, the value of $R_g$ fluctuates considerably throughout the positive grid region. For this reason, in order to determine the exact value of initial grid voltage which will be generated by a selected value of anode current passing through the primary of transformer 25, equation (5) is used to develop a load-line equation.

As $R_g$ approaches infinity, $I_g$ becomes zero and:

$$E_g - I_p n R_2 - E_{cc} \quad (6)$$

From equation (5)

$$I_g = \frac{E_g}{R_g} = \frac{I_p n R_2}{n^2 R_2 + R_g} - \frac{E_{cc}}{n^2 R_2 + R_g} \quad (7)$$

As $R_g$ approaches zero $E_g$ also approaches zero, and:

$$I_g \to \frac{I_p}{n} - \frac{E_{cc}}{n^2 R_2} \quad (8)$$

The two limiting equations for $E_g$ and $I_g$, (6) and (8) contain the information for formulating an $E_g$–$I_g$ load-line equation. The equation will be of the form $I_g = ME_g + B$ (9) where M and B are the slope of the load-line and the $I_g$ intercept, respectively.

The $I_g$ intercept expressed in equation (8) is $$\frac{I_p n R_2 - E_{cc}}{n^2 R_2} \quad (10)$$

The slope M has the form $$M = \left.\frac{-B}{E_g}\right]_{I_g=0} = \frac{-(I_p n R_2 - E_{cc})}{n^2 R_2} \times \frac{1}{(I_p n R_2 - E_{cc})} = -\frac{1}{n^2 R_2} \quad (11)$$

Therefore equation (9) becomes:

$$I_g = \frac{-E_g}{n^2 R_2} + \frac{I_p n R_2 - E_{cc}}{n^2 R_2} \quad (12)$$

which is the final equation for the grid circuit load line.

From the foregoing, the actual numerical value of grid voltage resulting from an arbitrary value of anode current can be found. First a value of anode current is selected. The load lines also represent some selected value of $R_2$.

Referring to FIG. 6, a value of 220 ohms is selected for $R_2$. The $I_p$ current levels are shown above each individual line and can be any selected values of $I_p$. From FIG. 6, corresponding pairs of values of $I_p$ and $E_g$ can be removed from each individual load-line plot.

Figure 7:
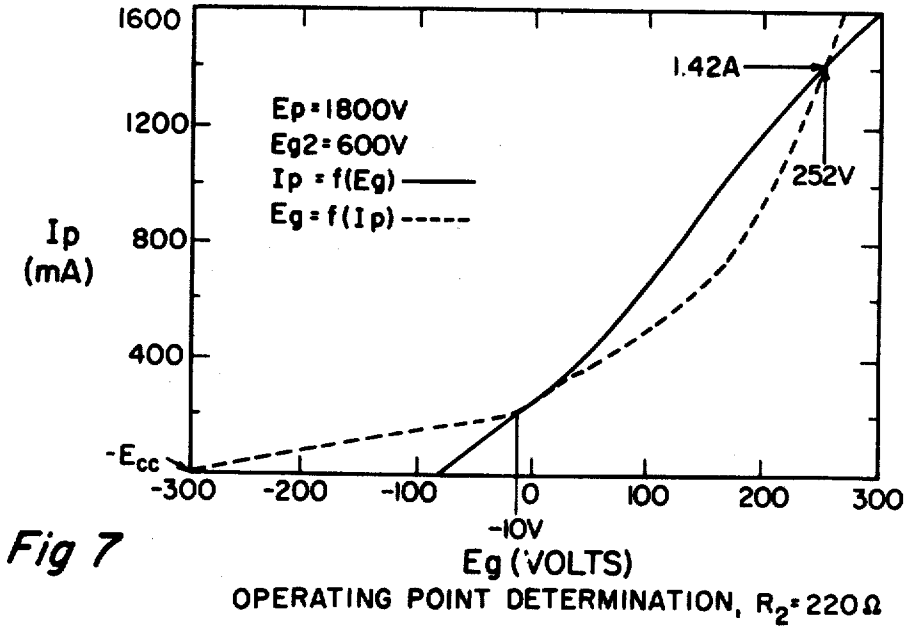
FIG. 7 is a graph used in determining the actual modulator circuit operation points.

When the $E_g=f(I_p)$ loci of FIG. 6 are plotted on the same graph as the familiar $I_p=f(E_g)$ curve there will be two intersecting points. Reference is made to FIG. 7 wherein the intersections occur at grid-voltage potentials of −10v and +252v. Each intersection is tested with equation (1) to determine the feedback gain, for if it is more than one, the operating point of the circuit is unstable.

Using the actual values of 6.3 as the turns ratio of the transformer, 220 ohms for $R_2$ and 3190 for the transconductance, the expression yields:

$$A_1=3190\times220\times6.3=4.42 \text{ for } -77\text{v.}<E_g<0$$

Thus, the circuit is unstable at the lower intersection point.

At the higher intersection point the equation yields:

$$A_1=(3000\ \mu\text{mhos})\ (16\ \text{ohms})\ (6.3)=0.302.\quad @E_g=+252\text{v}.$$

This particular operating point is stable and was the operating point found when the circuit was tested with the parameters given in these calculations. The comparison of predicted and experimental values are given below.

| Parameter | Predicted | Actual | % Error |
|---|---|---|---|
| $I_p$ | 1.5 a | 1.42 a | 5 |
| $E_g$ | +252 v | +240 v | 5 |

Figure 8:
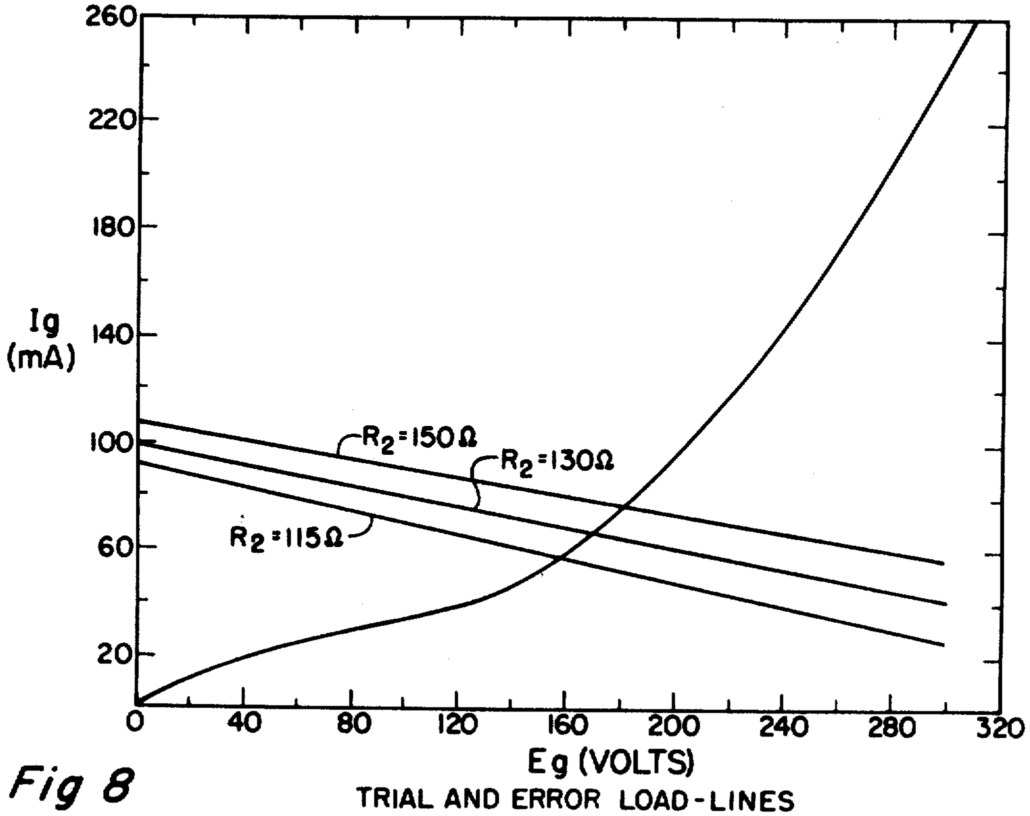
FIG. 8 is a graph of $E_g = f(I_p)$ load lines for different values of feedback.

Since the modulating anode current is very small, almost all of the 1.42 amperes can be expected to flow through $R_L$. If $R_L$ is 80 kilohms the total drop would be approximately 114 kv. This is not possible if the anode potential source is 80–90 kv. It is apparent that at 1.42 amperes anode current the modulator tube would be operating saturated if these parameters are used. Therefore, a lower level of current must be found for the stable operating point, preferably about 1 ampere. This can be accomplished by lowering the value of $R_2$. The following trial values of $R_2$ were used to plot $E_g$–$I_g$ load lines with an assumed $I_p$ of 1 ampere in FIG. 8. The object is to find a value of $R_2$ which will result in a value of $E_g$ of +160 v. which will cause an anode current of 1 a. to flow.

| $R_2$ | $I_g$ Intercept | Slope | Resultant $E_g$ |
|---|---|---|---|
| 150 Ω | 107 ma. | −1/6000 Ω | +180 v. |
| 130 Ω | 99 ma. | −1/5200 Ω | +169 v. |
| 115 Ω | 92 ma. | 1/4600 Ω | +157 v |

Interpolation indicates that approximately 119 Ω would be the proper value for $R_2$ provided the loop gain still has a value of less than unity at the proposed operating point and greater than unity below the operating point. The loop gain from cutoff to zero bias is:

$$A_1=G_mR_2n=3190\times119\times6.3=2.4$$

Figure 9:
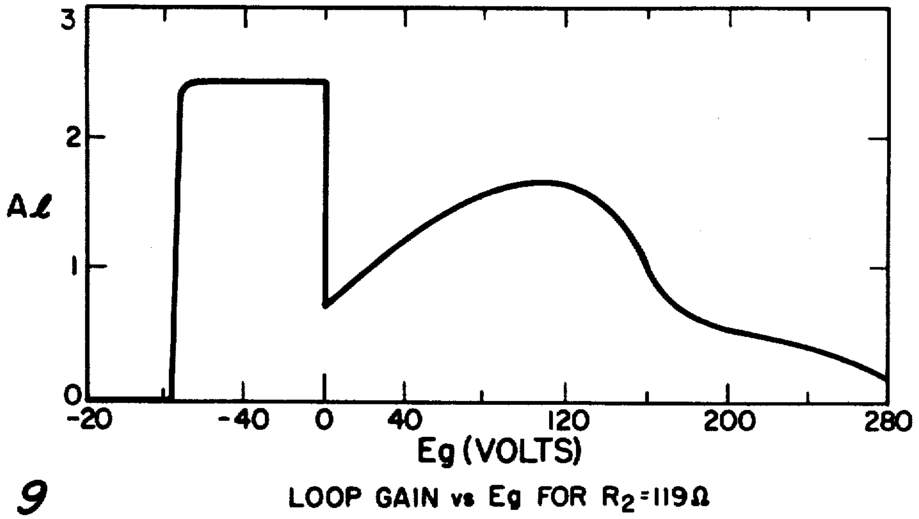
FIG. 9 is a graph of loop gain for the selected value of feedback.

This, being greater than unity, is satisfactory. There is the question, however, of just how the loop gain will now behave for positive grid voltages. FIG. 9 shows a new plot of $A_1$ vs. $E_g$ for an $R_2$ value of 119 Ω and shows that the preferred operating point is just inside the safe zone.

Figure 10:
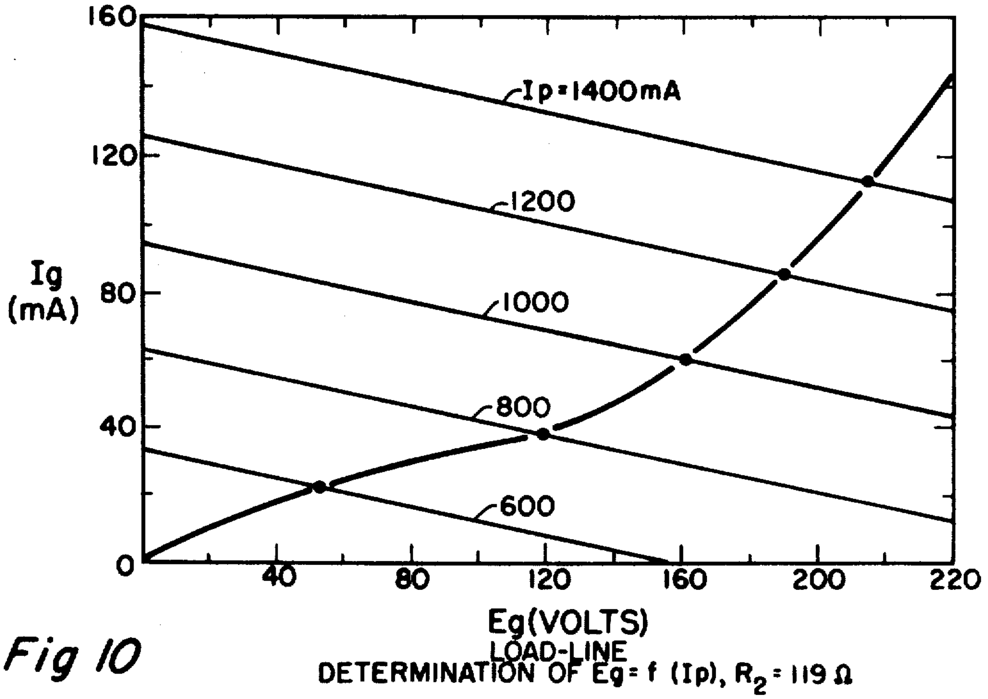
FIG. 10 is a graph showing load line-determined characteristics of the modulator circuit for the selected operating condition.
Figure 11:
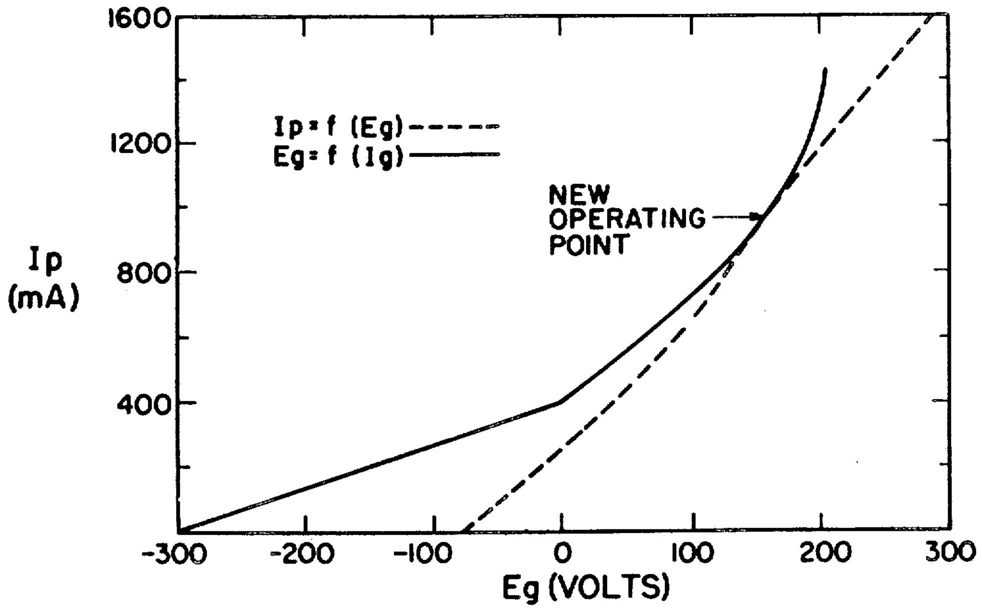
FIG. 11 is similar to FIG. 7, except that feedback is changed by the reduction in $R_2$ to 199 Ω.

Once the value of $R_2$ is decided upon, it is helpful to plot a new set of curves to determine the operating point. Several points are first found by the grid load-line method plotted in FIG. 10. Then as before, these points may be transferred and plotted on the same graph with the $I_p$, $E_g$ characteristic. This superimposed graph for $R_2=119$ ohms is shown in FIG. 11. The plot leads to the interesting result that the two curves barely touch each other. An obvious assumption is that the value of $R_2$ is close to the minimum if the other circuit parameters are held to the values used.

One important feature of the modulator output pulse is that it be reasonably constant over the pulse width required. The rate of pulse droop is largely dependent upon the open circuit inductance of $T_2$ although loop gain has some effect. Immediately after reaching the initial operating point the anode current will begin decaying. Normally, the anode current will be cut off by the negative going signal trigger applied to the control grid at the end of the desired pulse duration. If this terminating trigger is not applied, anode current and control grid voltage will eventually decay to a point where one of two actions will occur:

1. The operating point will approach a point where loop gain is greater than unity and the circuit will shut itself off by regeneration.
2. The core of transformer $T_2$ will saturate, greatly reducing the open-circuit inductance of $T_2$. This will result in greatly accelerated decay in positive feedback to shut the circuit off.

In the event that the first shutoff mechanism should occur, the pulse time duration before it occurs can be found by solving equation (4) for time. The result is $$t=\frac{L}{R}ln\left\{\frac{\frac{I_p}{n}(n^2R_2//R_g)+\frac{E_{cc}n^2R_2}{n^2R_2+R_g}}{E_g+E_{co}}\right\}$$

This expression reveals the period of a pulse that ends with some pair of $I_p$ and $E_g$ values that lie on the $I_p=f(E_g)$ curve. Since $R_g$ varies between any two operating points, some average value must be assumed.

Transformer $T_2$ used herein is a commercial unit intended for audio speaker applications. The open circuit inductance of the secondary was measured by pulsing the winding to the approximate operating level that would be seen in the modulator circuit with a known value of resistance in series. The value of inductance was then calculated by observing the rate of decay. The rate of decay was very slight for the first 2.96 milliseconds. The measured inductance for this period was 263 henries. After this point the inductance dropped (due to core saturation) to approximately 13.8 henries. When a value of L of 263 henries is used in the pulse duration expression above, the answer is much longer than 2.96 milliseconds. This indicates that core saturation would determine the end of the pulse if no terminating input trigger pulse were applied. Operation confirmed the expected result, the maximum pulse width obtainable being about 3 milliseconds. Since the maximum required is about 1.1 millisecond, the available pulse width of 3 milliseconds is adequate to provide trivial droop during the required duration.

What we claim is:

1. A high power pulsed modulator circuit for generating a sustained output pulse of the order of 80 kilovolts during the interval between input positive and negative signal pulses, comprising a modulator tube comprising a cathode, control grid and an anode, a close-coupled audio transformer having a primary and a secondary winding, and a load resistor, said transformer primary winding being directly connected to said cathode and to one end of said load resistor, a cathode-anode interelectrode potential source, the other end of the load resistor being connected to the negative pole of said potential source, a transformer loading resistor, means electrically connecting said transformer loading resistor in shunt with said transformer primary winding, an input signal source, and a grid bias source, means electrically connecting said input signal source, said grid bias source and the secondary winding of said transformer into a series string and means electrically connecting said series string between the cathode and grid of said modulator tube and means electrically connecting the anode of said modulator tube directly to the positive pole of said interelectrode potential source.

2. The modulator circuit of claim 1 in which the value of modulator tube current during delivery of an output pulse and the value of the cathode load resistor are preselected to provide the selected pulse amplitude and the stability of the modulator at such operating point is tested for a feedback factor of less than one by application of the formula $A_1=G_m r_1 n$ where $A_1$ is the feedback loop gain, $r_1$ is the effective resistance of the transformer loading resistance in parallel with the tube grid resistance at the operating point divided by the square of the transformer ratio and $n$ is the transformer turns ratio.

3. The modulator circuit of claim 2 in which the value of the transformer load resistance is established by selecting a value of anode current and establishing the corresponding operational grid voltage $I_g$ by the equation $$I_g=\frac{-E_g}{n^2R_2}+\frac{I_p n R_2-E_{cc}}{n^2R_2}$$

in which $E_g$ is the grid potential, $R_2$ is the value of the feedback transformer primary shunt resistor, and $E_{cc}$ is the value of grid bias, generating $I_g$,$E_g$ load lines in accordance with said formula in a graph including plate current $E_g$ loci for various values of transformer loading resistance whereby selection can be made of that value of transformer loading resistance which intercepts the load line at the value of grid voltage which results in the selected anode current.

4. The modulator circuit of claim 1 in which the input signal source comprises an input transformer in which the linkage inductance is small compared to the open circuit inductance and in which the primary winding is isolated from the secondary winding by insulation capable of withstanding at least 90 kilovolts, and wherein the secondary winding is connected between the modulator tube control grid and one terminal of the feedback transformer secondary winding, and the primary winding of the input transformer is connected to the output of an amplifier, a source of rectangular signal pulses, and an electrode controlled switch means, means electrically coupling the source of signal pulses to the switch means, said input primary winding and said switch means and a current limiting resistor connected in series and to a switch means potential source whereby the leading edge of a rectangular input signal pulses generates a positive voltage spike to initiate conduction in said modulator tube and the trailing edge of the rectangular input pulse generates a negative voltage spike to initiate termination of conduction of said modulator tube.

5. The method of making a regenerative rectangular pulse generator which comprises transformer coupling the cathode-anode interelectrode space of a thermionic tube in a positive feedback mode to the grid-cathode interelectrode space, shunting the transformer winding in series with the cathode-anode interelectrode space with a loading resistance, selecting the value of said resistance so that at less than peak magnitude of output pulse the feedback factor is greater than one, and at peak output pulse the feedback factor is less than one, by the following iterative steps:

1. Selecting value of anode current desired,
2. Selecting an apparently feasible value of loading resistance,
3. Plotting the loop gain by the formula $G_m r_1 n$ where $G_m$ is the transconductance, $r_1$ is the effective loading resistance comprising the actual value of loading resistance in parallel with the grid resistance divided by the square of the transformer ratio $n$, and $r_g$ the grid resistance equals $$\left.\frac{\partial E_g}{\partial I_g}\right|_{E_p, E_{g2}=\text{constant}}$$

4. Using the value of $E_g$ established by (3), plotting the $I_g = f(E_g)$ characteristic,
5. Plotting several $I_g=f(I_p)$ load lines on the same graph as (4) using values of $I_p$ in the range of interest and using the value of loading resistance of (2) to give tentative operating values of $I_p$ and $E_g$ at the interception points,
6. Using the values derived from (5), plotting the $E_g=f(I_p)$ and the $I_p=f(E_g)$ loci on one graph to locate new interception point or points which establish the value of $E_g$ at selected $I_p$ at the peak pulse output operating condition,
7. Referring said value of $E_g$ to the curve constructed in step (3) to see if loop gain for this value of $E_g$ is less than unity. If loop gain is less than unity, a stable operating point has been found.
8. If loop gain is greater than unity, or if the determined operating point not close enough to the desired operating point, selecting a new value of $R_2$ and repeating the procedure, starting with step (3).